United States Patent [19]
Roffman et al.

[11] Patent Number: 5,448,312
[45] Date of Patent: Sep. 5, 1995

[54] PUPIL-TUNED MULTIFOCAL OPHTHALMIC LENS

[75] Inventors: Jeffrey H. Roffman; Timothy R. Poling, both of Jacksonville, Fla.; Michel Guillon, London, England

[73] Assignee: Johnson & Johnson Vision Products, Inc., Jacksonville, Fla.

[21] Appl. No.: 988,088

[22] Filed: Dec. 9, 1992

[51] Int. Cl.⁶ .............................................. G02C 7/04
[52] U.S. Cl. ................................... 351/161; 351/177
[58] Field of Search ............... 351/160 R, 160 H, 161, 351/162, 177

[56] References Cited

U.S. PATENT DOCUMENTS

| | | | |
|---|---|---|---|
| 4,704,016 | 11/1987 | de Carle | 351/161 |
| 4,890,913 | 1/1990 | De Carle et al. | 351/161 |
| 4,923,296 | 5/1990 | Erickson | 351/161 |
| 5,002,382 | 3/1991 | Seidner | 351/161 |
| 5,024,517 | 6/1991 | Seidner | 351/161 |
| 5,054,905 | 10/1991 | Cohen | 351/161 |
| 5,151,723 | 9/1992 | Tajiri | 351/161 |

FOREIGN PATENT DOCUMENTS

| | | |
|---|---|---|
| 107444 | 5/1984 | European Pat. Off. . |
| 201231 | 11/1986 | European Pat. Off. . |
| 225098 | 6/1987 | European Pat. Off. . |
| 445994 | 9/1991 | European Pat. Off. . |
| 3246306 | 6/1984 | Germany . |
| 2139375 | 11/1984 | United Kingdom . |

*Primary Examiner*—Scott J. Sugarman

[57] ABSTRACT

An ophthalmic lens provides a cumulative ratio of distance to near focal length that is predominantly distance correction under high illumination, nearly evenly divided under moderate illumination, and favoring again distance vision correction under low level illumination. The lens is specifically adjusted to match the patient's pupil size as a function of illumination level, in the preferred embodiment by applying pupil size parameters as a function of age. This lens has the properties of matching both the distribution of near and distance focal vision correction to the type of human activity typically undertaken in various illumination conditions, as well as matching particular lens dimensions to suit the size of the pupil as a function of illumination intensity.

10 Claims, 4 Drawing Sheets

PUPIL-TUNED MULTIFOCAL OPHTHALMIC LENS

BACKGROUND OF THE INVENTION

This invention pertains to the subject of ophthalmic lenses, and in particular contact lenses containing more than one optical power or focal length.

It is well known that as an individual ages, the eye is less able to accommodate, i.e., bend the natural lens in the eye in order to focus on objects that are relatively near to the observer. This condition is referred to as presbyopia, and presbyopes have in the past relied upon spectacles or other lenses having a number of different regions with different optical powers to which the wearer can shift his vision in order to find the appropriate optical power for the object or objects upon which the observer wishes to focus.

With spectacles this process involves shifting one's field of vision from typically an upper, far power to a different, near power. With contact lenses, however, this approach has been less than satisfactory. The contact lens, working in conjunction with the natural lens, forms an image on the retina of the eye by focusing light incident on each part of the cornea from different field angles onto each part of the retina in order to form the image. This is demonstrated by the fact that as the pupil contracts in response to brighter light, the image on the retina does not shrink, but rather, light coming through a smaller area of the lens constructs the entire image.

Similarly, for a person that has had the natural lens of the eye removed because of a cataract condition and an intraocular lens inserted as a replacement, the ability to adjust the lens (accommodate) to the distance of the object being viewed is totally absent. In this case, the lens provided is usually set at the single infinity distance focal power and spectacles are worn to provide the additional positive optical power needed for in-focus close vision. For such a patient, a functional multifocal lens would be particularly useful.

It is known in the art that under certain circumstances that the brain can discriminate separate competing images by accepting the in-focus image and rejecting the out-of-focus image.

One example of this type of lens used for the correction of presbyopia by providing simultaneous near and far vision is described in U.S. Pat. No. 4,923,296 to Erickson. Described therein is a lens system which comprises a pair of contact lenses each having equal areas of near and distant optical power, the lens for one eye with a near upper half and a distant lower half while the lens for the other eye contains a distant upper half and near lower half. Together these are said to provide at least partial clear images in both eyes, and through suppression by the brain of the blurred images, allows alignment of the clear image to produce an in-focus image.

U.S. Pat. No. 4,890,913 to de Carle describes a bifocal contact lens comprising a number of annular zones having different optical powers. The object in the design of this lens is to maintain, at all times regardless of pupil diameter, an approximately equal division between near and distant powers, requiring on the lens between 6 and 12 total zones.

Another attempt at providing a bifocal contact lens is described in U.S. Pat. No. 4,704,016 to de Carle. Again, this lens attempts to maintain, at all times regardless of pupil diameter, an approximately equal division between near and distant powers.

Another approach to producing a multifocal corrective eye lens involves the use of diffractive optics. One of the shortcomings of this approach has been a deficiency in vision at low light levels. In a diffractive design only about 40% of the light incident on the lens is used for near vision with another 40% being used for far vision. The remaining 20% is not used for either near or far vision, but rather is lost to higher orders of diffraction and scatter effect. This represents the best theoretical case and in manufacturing reality even less light is available due to manufacturing difficulties. Difficulty of manufacture in general represents another shortcoming of diffractive lenses since the diffractive surface must be to tolerances on the order of the wavelength of light.

One attempt known in the art to provide a method of compensating for presbyopia without complex lens manufacture is known as "monovision". In the monovision system a patient is fitted with one contact lens for distant vision in one eye and a second contact lens for near vision in the other eye. Although it has been found that with monovision a patient can acceptably distinguish both distance and near objects, there is a substantial loss of binocularity, i.e. depth perception.

For these reasons, although simple systems such as monovision are somewhat understood, more complex schemes for multifocal refractive lenses are primarily theoretical.

U.S. Pat. Nos. 5,002,382 and 5,024,517 both issued to Seidner, disclose complementary pairs of contact lenses having two or more corrective optical powers in opposite configurations. Both of the lenses in the pair, however, contain only two zones of different optical power.

A more practical and improved approach to providing a multi-focal ophthalmic lens is described in application Ser. No. 7/827,199 filed on Jan. 28, 1992 abandoned in favor of continuation application Ser. No. 142,649 filed on Oct. 25, 1993. In this application there is disclosed a multifocal ophthalmic lens characterized by having a central zone wherein one of the multifocal segments includes the central zone of the lens. The boundary between the segments is defined by an arcuate path such as a semi-circle having both ends of the path on the adjoining parameter of the near and distant segments to eliminate from the central optical axis the segment boundaries including the central junction point.

While the lenses made according to the above described applications are functional under certain illumination conditions with some patients, the general level of satisfaction with multifocal ophthalmic lenses has not been overwhelming. Patients all too often have problems with competing images under high levels of illumination, reading under medium-to-low illumination conditions, and halo problems around light sources in night driving situations.

It is an object, therefore, of the present invention to provide an ophthalmic lens for a presbyope that yields improved visual acuity in general, and in particular, matches the focal requirements under various light intensity conditions.

It is a further object of the invention to describe a method for determining the manner in which such lenses are to be fitted to a patient to produce the desired improvement in vision, especially by matching the optical power required for under various illumination situation to the patient's pupil diameter under such illumination conditions.

SUMMARY OF THE INVENTION

The above objectives of matching both the distribution of near and distance focal vision correction to the type of human activity typically undertaken in various illumination conditions, as well as matching particular lens dimensions to suit the size of the pupil as a function of illumination intensity, is achieved by an ophthalmic lens designed to provide a cumulative ratio of distance to near focal length that is predominantly distance correction under high illumination, nearly evenly divided under moderate illumination, and favoring again distance vision correction under low level illumination. The lens is specifically adjusted to match the patient's pupil size as a function of illumination level, in the preferred embodiment by applying pupil size parameters as a function of age.

DESCRIPTION OF THE PREFERRED EMBODIMENT

Figure 1:
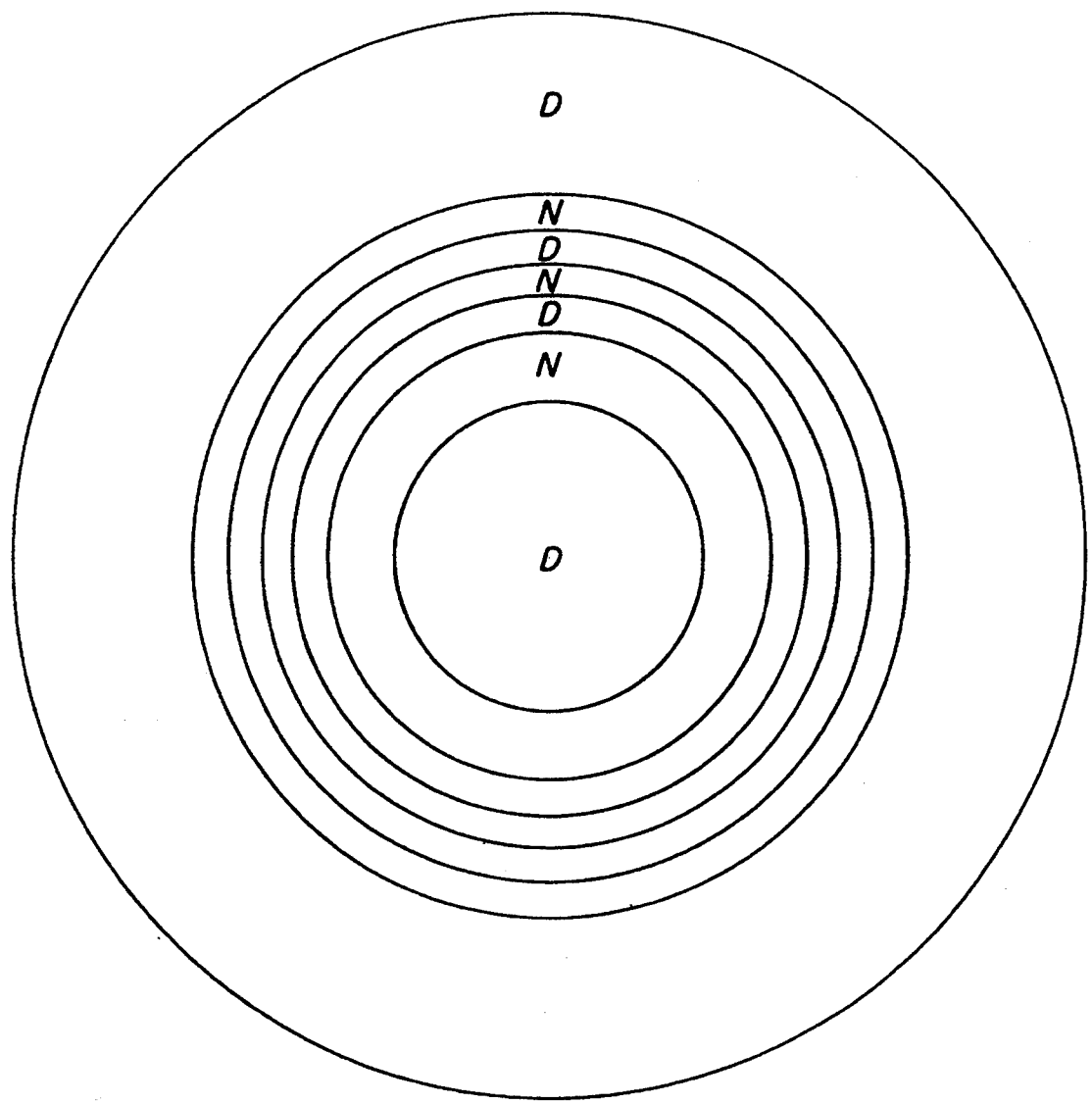
FIG. 1 shows the optical zone of an ophthalmic lens constructed according to the principles of the present invention.

It has been discovered that previous measurements of horizontal pupil size and the generally accepted statistics on those sizes have been primarily generated from students of optometry and ophthalmology because of their ready availability and eagerness to cooperate in such studies. It has been discovered however, that the pupil size and thus pupil area differ significantly for those who are older than the typical student of optometry or ophthalmology.

Because the pupil size has a function of light intensity it is an important parameter in the design of ophthalmic lenses, particularly contact lenses and intraocular lenses. It has been found that the shortcoming of many of these lenses can, in part, be attributed to wrong assumptions used in the pupil size as a function of illumination intensity.

Reliable data was obtained from people in four different age groups. Those less than 20 years of age, those between 20 and 40 years of age, those between 40 and 60 years of age and those over 60 years of age. These pupil measurements were made on test subjects at three different luminance levels, 250, 50, and 2.5 candellas per square meter (cd/m$^2$).

The 250 cd/m$^2$ level corresponds to extremely bright illumination typically outdoors in bright sunlight. The 50 cd/m$^2$ is a mixed level which is found in both indoors and outdoors. Finally, the 2.5 cd/m$^2$ level is most typically found outdoors at night, usually in an uneven illumination situation such as night driving.

The results of these studies are giving in the following Table I, which includes in addition to the average pupil diameter at three different illumination levels, the standard deviation in the diameter and the range associated therewith.

TABLE I

| Illumination (candellas/m$^2$) | Average Pupil Diameter(mm) | Standard Deviation (1Σ) | 1Σ Range |
|---|---|---|---|
| LESS THAN 20 YEARS OF AGE | | | |
| 2.5 | 6.5962 | 0.9450 | 4.2807 to 7.8562 |
| 50 | 4.3499 | 0.5504 | 3.4246 to 5.4641 |
| 250 | 3.4414 | 0.3159 | 2.8958 to 4.1799 |
| 20 to 40 YEARS OF AGE | | | |
| 2.5 | 6.4486 | 0.8259 | 3.6766 to 8.3598 |
| 50 | 4.4843 | 0.6342 | 2.5433 to 6.0936 |
| 250 | 3.5040 | 0.4217 | 2.4933 to 4.7843 |
| 40 to 60 YEARS OF AGE | | | |
| 2.5 | 5.4481 | 0.9787 | 3.3742 to 7.5289 |
| 50 | 3.6512 | 0.5692 | 2.3922 to 5.5396 |
| 250 | 3.0368 | 0.4304 | 2.1152 to 4.4066 |
| GREATER THAN 60 YEARS OF AGE | | | |
| 2.5 | 4.7724 | 0.6675 | 3.4749 to 6.3706 |
| 50 | 3.4501 | 0.5106 | 2.6944 to 5.4389 |
| 250 | 2.8260 | 0.3435 | 2.1008 to 4.0037 |

Taken in combination with this data are the determinations that have been made regarding real world human activity typically encountered under different illumination levels. At very high illumination levels, such as that represented by 250 cd/m$^2$, human activity is typically is taking place outdoors in bright sunlight and requires distant vision tasks.

At a 50 cd/m$^2$ illumination level, activity usually occurs both indoors and out, and typical human activity is represented by both near and far visual tasks.

Finally, at low illumination levels represented by the 2.5 cd/m$^2$ the activity that takes place is typically outdoors at night and usually involves distant vision tasks, such as driving an automobile.

These above discoveries taken in combination with the teachings of my application Ser. No. 988,071 filed Dec. 9, 1992 entitled "Multifocal Ophthalmic Lens Pair," the preferred embodiment of the present invention is thereby derived.

Specifically, an ophthalmic lens should be constructed of three general annular lens portions in a multifocal design, having only the patient's distance corrective power found in the central annular portion of the lens, substantially equal cumulative amounts of near optical power focal correction for the patient in a first annular portion exterior to the central portion of the lens, and finally, a second annular portion with additional distance focal power near the periphery of the optical surface area of the ophthalmic lens. Each of these two annular portions of the lens optical surface is constructed of several optical zones, each zone having the near or distance optical power and working in combination to yield the desired focal ratio in that portion.

The corrective powers as a function of the distance from the center of the lens must be a function of the patient's specifically measured pupil diameter at varying illumination levels, or it can be readily determined from the above information based upon the age of the patient.

Referring now to FIG. 1 there is shown the optical surface of an ophthalmic lens constructed according to the present invention. The typical contact lens is usually constructed with a non-optical lenticular area (not shown) outside the optical surface for a total diameter of 14 mm. As can be seen from the Figure, the center and second annular (peripheral) portion of the optical surface of the lens is heavily biased toward distant vision. There is provided by the first annular portion, however, a preponderance of near vision optical power to provide under intermediate light conditions an approximately equal amount of near and distance focal length images.

Figure 2:
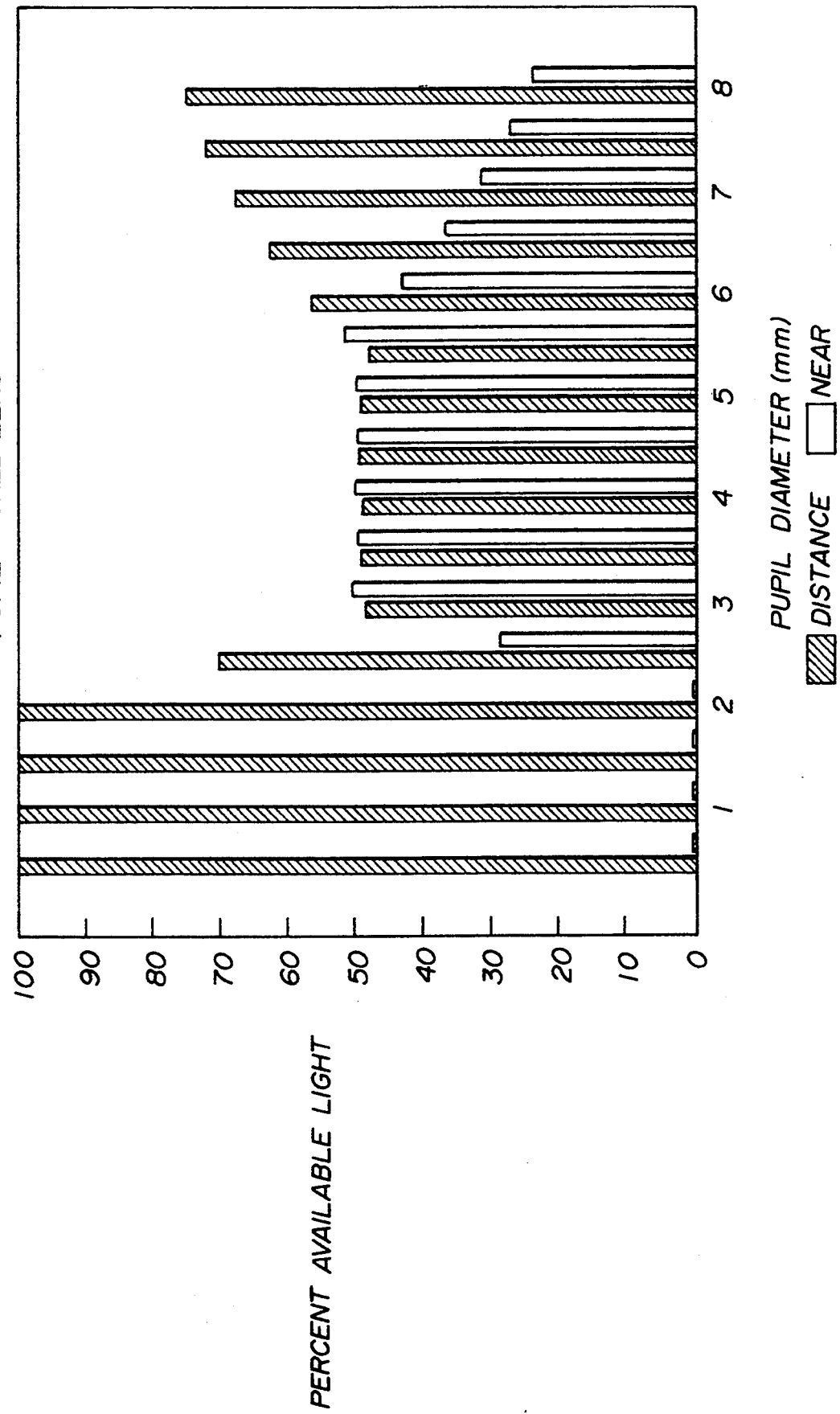
FIG. 2 is a bar graph comparing the fraction of near and distant focal lengths for the lens of FIG. 1 as a function of pupil diameter.

Referring now to FIG. 2, there is shown in bar graph form a comparison between distance and near focal length image areas at various pupil diameters for a lens constructed according to FIG. 1.

It is clear from this Figure, that the above objective of having a predominant distant vision at small and large pupil diameters corresponding to high and extremely low level illumination intensities and nearly identical distance and near areas at intermediate diameters corresponding to moderate illumination levels has been achieved.

The design parameters for this lens which is specifically designed to accommodate a person of an age between 40 years and 60 years is given in the following Table II. The appropriateness of this design for such an individual can be confirmed by referring back to Table I relating pupil size to patient age.

TABLE II

PUPIL-TUNED LENS

| Pupil Diameter | Pupil Percent (%) | Distance | Near |
| --- | --- | --- | --- |
| 0.00 | 0.00 | 100 | 0 |
| 0.50 | 6.3 | 100 | 0 |
| 1.00 | 12.5 | 100 | 0 |
| 1.50 | 18.8 | 100 | 0 |
| 2.00 | 25.0 | 100 | 0 |
| 2.15 | 26.9 | 0 | 100 |
| 2.50 | 31.3 | 0 | 100 |
| 3.00 | 37.5 | 0 | 100 |
| 3.30 | 41.3 | 100 | 0 |
| 3.50 | 43.8 | 100 | 0 |
| 3.80 | 47.5 | 0 | 100 |
| 4.00 | 50.0 | 0 | 100 |
| 4.30 | 53.8 | 100 | 0 |
| 4.50 | 56.3 | 100 | 0 |
| 4.80 | 60.0 | 0 | 100 |
| 5.00 | 62.5 | 0 | 100 |
| 5.35 | 66.9 | 100 | 0 |
| 5.50 | 68.8 | 100 | 0 |
| 6.00 | 75.0 | 100 | 0 |
| 6.50 | 81.3 | 100 | 0 |
| 7.00 | 87.5 | 100 | 0 |
| 7.50 | 93.8 | 100 | 0 |
| 8.00 | 100.0 | 100 | 0 |

The results and advantages of the above lens constructed according to the present invention becomes more clear when compared to a similar analysis of prior art lenses. Considered first is the typical three zone annular ophthalmic lens having a central distant portion followed by an annular near zone and then a distance zone.

Figure 3:
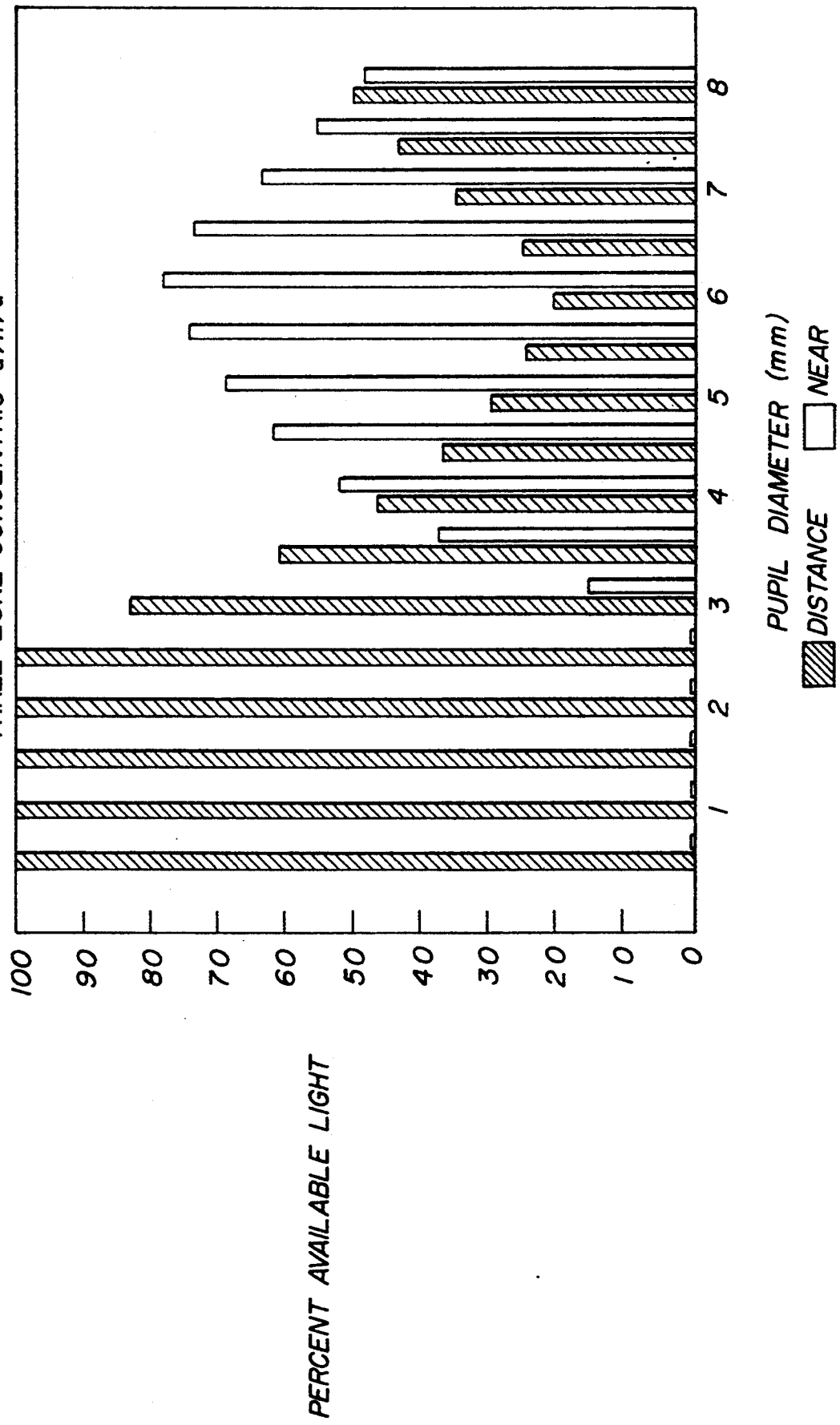
FIG. 3 is a bar graph comparing the fraction of near and distant focal lengths for a distance/near/distance lens constructed according to the prior art.

Referring now to FIG. 3 there is presented a graph analogous to that of FIG. 2 showing the same information, i.e. the percent distribution of distance and near focal length area for different pupil diameters.

As is readily apparent, the distribution of distance and near optical powers is substantially different from the design of the present invention, despite the fact that the physical designs may appear to be similar. In particular, this distant and near distant design provides the patient no usable near vision unless the light level is between the far end of the mid-range extremely low illumination (that is the pupil diameter is near its maximum). From this data, it is now more readily apparent why prior art lenses having this type of optical construction have been only marginally successful.

The particular design parameter assumed for this example are given in the following Table III.

TABLE III

DISTANCE/NEAR/DISTANCE LENS

| Pupil Diameter | Pupil Percent (%) | Distance | Near |
| --- | --- | --- | --- |
| 0.00 | 0.00 | 100 | 0 |
| 0.50 | 6.3 | 100 | 0 |
| 1.00 | 12.5 | 100 | 0 |
| 1.50 | 18.8 | 100 | 0 |
| 2.00 | 25.0 | 100 | 0 |
| 2.50 | 31.3 | 100 | 0 |
| 2.80 | 35.0 | 0 | 100 |
| 3.00 | 37.5 | 0 | 100 |
| 3.50 | 43.8 | 100 | 0 |
| 4.00 | 50.0 | 0 | 100 |
| 4.50 | 56.3 | 0 | 100 |
| 5.00 | 62.5 | 0 | 100 |
| 5.50 | 68.8 | 0 | 100 |
| 6.00 | 75.0 | 0 | 100 |
| 6.30 | 78.8 | 100 | 0 |
| 6.50 | 81.3 | 100 | 0 |
| 7.00 | 87.5 | 100 | 0 |
| 7.50 | 93.8 | 100 | 0 |
| 8.00 | 100.9 | 100 | 0 |

Figure 4:
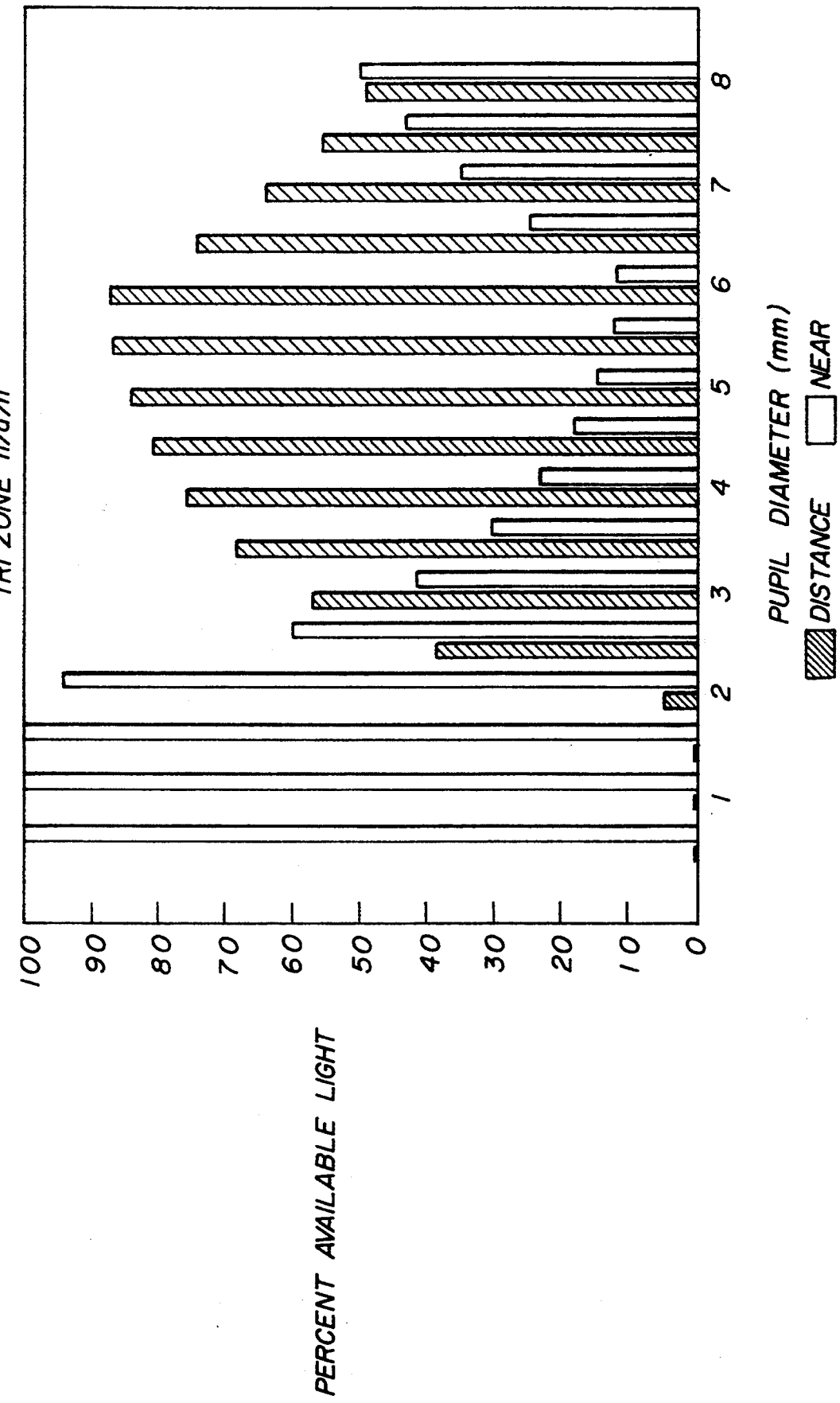
FIG. 4 is a bar graph comparing the fraction of near and distant focal lengths for a near/distance/near lens constructed according to the prior art.

An analysis of a similarly constructed lens with an opposite plurality (near, distant, near) is given in FIG. 4. The same general type of difficulty is apparent in this type of lens. Under high illumination there is no distance component which is needed for outdoor distant activity such as in bright sunlight and distance vision suffers even in mid range illumination levels. Finally, under extreme low level light conditions, distant vision is provided for no more than 50% of the available light.

The design parameters used in constructing this lens to get the example shown in FIG. 4 is given in the following Table IV.

TABLE IV

NEAR/DISTANCE/NEAR LENS

| Pupil Diameter | Pupil Percent (%) | Distance | Near |
| --- | --- | --- | --- |
| 0.00 | 0.00 | 0 | 100 |
| 0.50 | 6.3 | 0 | 100 |
| 1.00 | 12.5 | 0 | 100 |
| 1.50 | 18.8 | 0 | 100 |
| 2.00 | 25.0 | 100 | 0 |
| 2.50 | 31.3 | 100 | 0 |
| 3.00 | 37.5 | 100 | 0 |
| 3.50 | 43.8 | 100 | 0 |
| 4.00 | 50.0 | 100 | 0 |
| 4.50 | 56.3 | 100 | 0 |
| 5.00 | 62.5 | 100 | 0 |
| 5.50 | 68.8 | 100 | 0 |
| 6.00 | 75.0 | 0 | 100 |
| 6.50 | 81.3 | 0 | 100 |
| 7.00 | 87.5 | 0 | 100 |
| 7.50 | 93.8 | 0 | 100 |

Similar analysis for two zone lenses yield distributions that are similar in that they are inappropriate for the pupil size and type of activity that takes place under different illumination levels.

As an alternative to using concentric optical zones the annular portions may have the requisite ratio of distant and near focal lengths by employing the design scheme found in my applications Ser. No. 7/827,199 filed on Jan. 28, 1992. This design method employs continuous radial segments containing different optical powers across annular portions.

As a further improvement to the specific execution of this lens design, it may be preferred to incorporate the teachings of my earlier U.S. Pat. No. 5,505,981, in the design of the surface of the near optical zones of the lens. That is, the incorporation of an aspheric lens design on the near vision zones of the lens, especially a peripheral near optical zone.

We claim:

1. An ophthalmic lens containing both a first refractive optical power and a second refractive optical power, one of said refractive optical powers being for distance and the other of said refractive optical powers being for near vision said lens containing an optical surface with a central portion having said first optical power focusing substantially all the incident light at the first optical power, a first annular portion exterior said central portion containing more second optical power area than total first optical power area in the central and first annular portions combined, and a second annular portion exterior said first annular portion and containing sufficient first optical power area such that the total first optical power area in the central, first annular and second annular portions combined is greater than the total second optical power area in the central, first annular and second annular portions combined.

2. The lens of claim 1 wherein the lens comprises annular portions of a concentric construction.

3. The lens of claim 1 wherein at least one of said annular portions contains more than one optical power.

4. The lens of claim 3 wherein the optical powers of said annular portions comprise optical zones that are radial segments across boundaries of said annular portions.

5. The lens of claim 1 wherein said lens is a bifocal lens where the combined central portion and first annular portion focus about half of the incident light at the second optical power, and the combined central portion, first annular portion and second annular portion focus more than about half of the incident light at the first optical power.

6. The lens of claim 1 wherein said first optical power is a distance optical power and said second optical power is a near optical power.

7. The lens of claim 6 wherein said lens is a bifocal lens where the combined central portion and first annular portion focus about half of the incident light at the near focal length and the combined central portion, first annular portion and second annular portion focus more than about half of the incident light at the distance focal length.

8. A method of providing multifocal vision correction to a patient, said method comprising the steps of:

determining the pupil diameter of the patient as a function of illumination intensity, determining the near optical power required for the patient, determining the distance optical power required for the patient, one of said near and distance optical powers being a first optical power and the other of said powers being a second optical power, configuring a refractive ophthalmic lens to have a cumulative optical power ratio of near power to distance power that varies with radial distance from the lens center corresponding to the patient's pupil diameter as a function of illumination intensity, said variation in cumulative optical power ratio of first optical power to second optical power with radial distance from the lens center corresponds to a central portion with said first optical power, a first annular portion exterior said central portion containing more second optical power area than first optical power area such that the total combined first and second area of the central and first annular portions are substantially equal, and a second annular portion exterior said first annular portion and containing sufficient first optical power area such that the total first optical power area in the central, first annular and second annular portions combined is greater than the total second optical power area in the central, first annular and second annular portions combined, providing the patient with at least one such ophthalmic lens.

9. The method of claim 8 wherein said first optical power is the distance optical power and said second optical power is the near optical power.

10. The method of claim 8 wherein said patient pupil diameter as a function of illumination intensity is determined by ascertaining the patient's age.

* * * * *